(12) United States Patent
Syo

(10) Patent No.: US 12,405,604 B2
(45) Date of Patent: Sep. 2, 2025

(54) FAULT PREDICTION DEVICE AND FAULT PREDICTION METHOD

(71) Applicant: RENESAS ELECTRONICS CORPORATION, Tokyo (JP)

(72) Inventor: Toshiyuki Syo, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 480 days.

(21) Appl. No.: 17/837,440

(22) Filed: Jun. 10, 2022

(65) Prior Publication Data

US 2022/0404822 A1 Dec. 22, 2022

(30) Foreign Application Priority Data

Jun. 22, 2021 (JP) ................................ 2021-103286

(51) Int. Cl.
G05B 23/02 (2006.01)

(52) U.S. Cl.
CPC ..... G05B 23/0254 (2013.01); G05B 23/0283 (2013.01)

(58) Field of Classification Search
None
See application file for complete search history.

(56) References Cited

U.S. PATENT DOCUMENTS

| | | | |
|---|---|---|---|
| 2018/0082150 A1* | 3/2018 | Itou | G06F 11/0754 |
| 2019/0286506 A1* | 9/2019 | Cheng | G06F 11/0793 |
| 2020/0274477 A1 | 8/2020 | Nakamura | |
| 2021/0010909 A1* | 1/2021 | Yanagihashi | G10L 25/51 |
| 2021/0349697 A1* | 11/2021 | Nupponen | G06N 3/045 |

FOREIGN PATENT DOCUMENTS

| | | | | |
|---|---|---|---|---|
| JP | 2003050618 A | * | 2/2003 | |
| JP | 2018180732 A | * | 11/2018 | G03G 5/08 |
| JP | 2020-137327 A | | 8/2020 | |

* cited by examiner

Primary Examiner — Michael J Dalbo
Assistant Examiner — Denise R Karavias
(74) Attorney, Agent, or Firm — Rimon P.C.

(57) ABSTRACT

A fault prediction device capable of predicting an accurate deterioration state is provided. A fault prediction device for predicting fault of a target device whose deterioration state transitions with elapse of time includes autoencoders AED1 to AED4 respectively corresponding to deterioration states of the target device. The autoencoder AED2 corresponding to a first deterioration state determines whether the target device exists in the first deterioration state or not based on a state signal indicating a state of the target device. In a case where it is determined that the target device does not exist in the first deterioration state, the autoencoder AED3 corresponding to a second deterioration state determines whether the target device exists in the second deterioration state or not based on the state signal.

10 Claims, 8 Drawing Sheets

4: Processor
AED1 to AED4: Autoencoder

FAULT PREDICTION DEVICE AND FAULT PREDICTION METHOD

CROSS-REFERENCE TO RELATED APPLICATIONS

The disclosure of Japanese Patent Application No. 2021-103286 filed on Jun. 22, 2021 including the specification, drawings and abstract is incorporated herein by reference in its entirety.

BACKGROUND

The present invention relates to a fault prediction device and a fault prediction method, and for example, the present invention relates to a fault prediction device and a fault prediction method using Artificial Intelligence (hereinafter, referred to as "AI").

As a technique for determining fault of a device, Patent Document 1 describes a technique using machine learning, which is one example of AI, for example. Patent Document 1 describes a technique for determining fault by using a detected value and a learned model.

There are disclosed techniques listed below. [Patent Document 1] Japanese Unexamined Patent Application Publication No. 2020-137327

SUMMARY

It is conceivable to use AI to determine a deterioration state of a device and predict fault.

In this case, it is conceivable to use a Long Short-Term Memory (LSTM) technology as AI. With the LSTM technology, by storing past information in a memory and incorporating the past information into inference calculation, it is possible to combine past states and current information to predict a current state and future trends, and this makes it possible to predict fault of a target device.

In this case, when the time constant (interval) at which a state of the target device transitions is short, it is possible to suppress an increase in the amount of past information to be stored. It is possible to realize a fault prediction device using the LSTM technology. However, in a case where the time constant at which a state of a target device such as a motor transitions is relatively long, the amount of past information becomes very large. For that reason, it is practically difficult to realize a failure prediction device by a small number of parts, for example, one processor (semiconductor device).

On the other hand, in a case where the time constant of a target device is relatively long, the following techniques can be considered as a technique for estimating a deterioration state of the target device. Namely, it is conceivable to realize a fault prediction device by putting the target device into a certain deterioration state, changing environmental conditions (temperature, a load condition, and the like) that may occur under an actual installation condition of the target device, obtaining a state signal indicating a state of the target device as time-series information for a certain period of time, and using this as learning information of AI. In this case, it is possible to suppress an increase in the amount of information. However, unlike the LSTM technology, since the deterioration state of the target device is estimated only by information at the present time, there is a problem that it becomes difficult to estimate an accurate deterioration state.

Patent Document 1 merely describes a motor as a target device, but does not describe that an accurate deterioration state is estimated to predict fault of the target device.

An outline of representative one of embodiment disclosed in the present application will briefly be explained as follows.

A fault prediction device for predicting fault of a target device whose deterioration state transitions with elapse of time includes: a plurality of autoencoders respectively corresponding to deterioration states of the target device, the plurality of autoencoders including a first autoencoder corresponding to a first deterioration state and a second autoencoder corresponding to a second deterioration state different from the first deterioration state. The first autoencoder determines whether the target device exists in the first deterioration state or not on a basis of a state signal indicating a state of the target device. In a case where the first autoencoder determines that the target device does not exist in the first deterioration state, the second autoencoder determines whether the target device exists in the second deterioration state or not on a basis of the state signal.

The other object and new feature will become apparent from description of the present specification and the accompanying drawings.

According to one embodiment, it is possible to provide a fault prediction device capable of predicting an accurate deterioration state.

DETAILED DESCRIPTION

Figure 1:
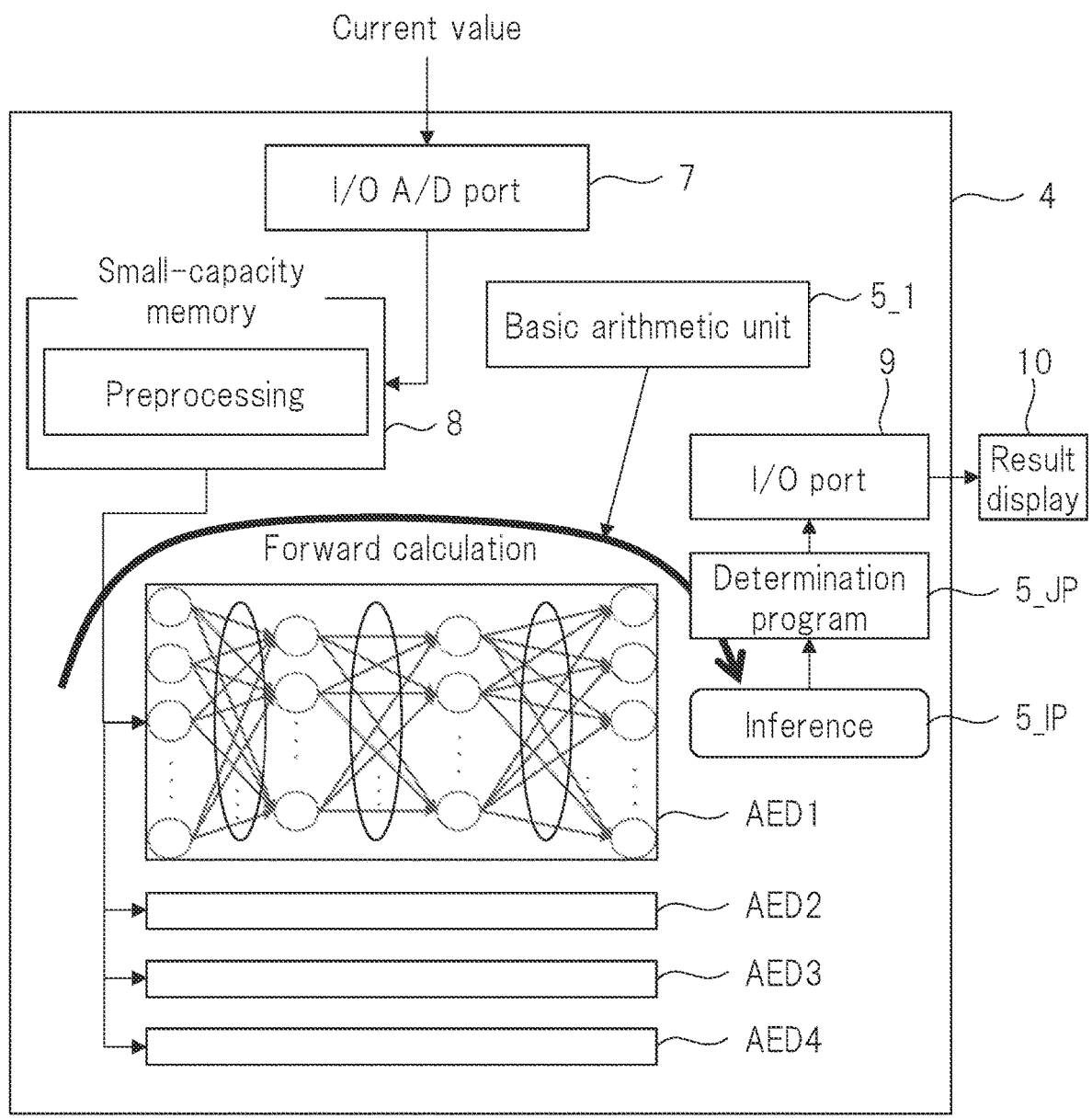
FIG. 1 is a view for explaining inference by a fault prediction device according to an embodiment.

Hereinafter, an embodiment of the present invention will be described with reference to the drawings. Note that the disclosure is just one example, and suitable modifications that can be easily conceived by a person skilled in the art without departing from the spirit of the present invention are included within the scope of the present invention as a matter of course.

Further, in this specification and the respective drawings, the same reference numerals are respectively assigned to the similar components described in the drawings, which have already been described. Detailed description thereof may be omitted appropriately.

In the following description, a fault prediction device using autoencoders (Autoencoders), which is one of neural networks, as AI will be described. However, it is not limited to this.

EMBODIMENT

<Overall Configuration>

Figure 4:
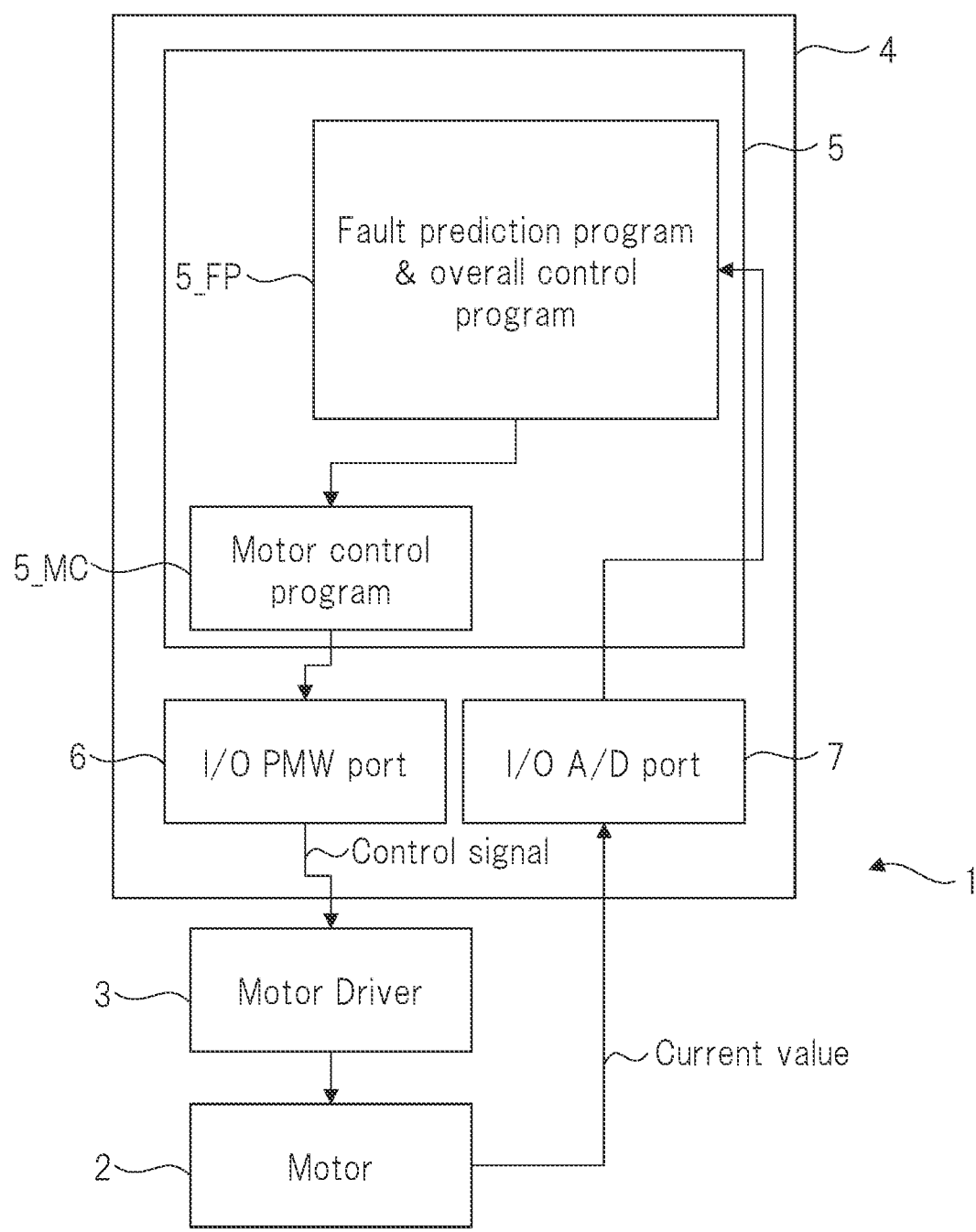
FIG. 4 is a block diagram illustrating a configuration of an electronic device according to the embodiment.

Before explaining details of a fault prediction device according to the embodiment, a target device to be a target of fault prediction and the overall configuration of the fault prediction device coupled to the target device will be described. FIG. 4 is a block diagram illustrating a configuration of an electronic device according to the embodiment. In the embodiment, the target device for which a fault it to be predicted is a motor 2.

In FIG. 4, an electronic device 1 includes the motor 2 that is the target device, a motor driver 3 configured to drive the motor 2, and a processor 4 configured to supply a control signal to the motor driver 3. Although it is not limited particularly, in the embodiment, the processor 4 is composed of one semiconductor device.

The processor 4 includes a plurality of circuit blocks, but FIG. 4 illustrates only the circuit blocks necessary for explanation. In FIG. 4, a reference numeral 5 denotes a processor core, and the processor core 5 is configured to execute a plurality of programs stored in a memory (not illustrated in FIG. 4). In FIG. 4, reference numerals 6 and 7 denote input/output (I/O) ports of the processor 4. Here, the reference numeral 6 denotes a PWM (Pulse Width Modulation) output port (I/O PWM port) via which the control signal to be supplied to the motor driver 3 is outputted, and the reference numeral 7 denotes an A/D conversion input port (I/O A/D port) via which a state signal indicating a state of the motor 2 is supplied. Of course, other input/output ports may be provided in the processor 4.

The processor core 5 executes the plurality of programs as described above, FIG. 4 clearly illustrates a fault prediction program & overall control program 5_FP and a motor control program 5_MC among these programs. Note that in the following description, in a case where the fault prediction program of the fault prediction program & overall control program 5_FP, 5_FPP is used as a reference numeral (not illustrated in FIG. 4).

The processor core 5 controls the PWM output port 6 by executing the motor control program 5_MC. As a result, the PWM output port 6 outputs the control signal having a pulse width modulated in accordance with a control of the processor core 5.

The motor driver 3 drives the motor 2 in accordance with the supplied control signal. This drive causes the motor 2 to rotate. The rotation of the motor 2 drives an object (not illustrated in the drawings) coupled to the motor 2. Further, the motor 2 is driven to output the state signal indicating the state of the motor 2. As this state signal, there are a value of a current flowing through the motor 2 (current value), rotation speed, temperature, a value of a load, and the like. In FIG. 4, the current value flowing through the motor 2 is illustrated as an example of the state signal.

The state signal (current value) from the motor 2 is supplied to the A/D conversion input port 7 of the processor 4. At this A/D conversion input port 7, an analog state signal is converted into a digital signal, and the digital signal is supplied to the processor core 5.

The processor core 5 controls the entire processor 4 and predicts a fault of the motor 2 by executing the fault prediction program & overall control program 5_FP. Prediction of a fault of the motor 2 is executed on the basis of the state signal converted into the digital signal. Further, the execution of the motor control program 5_MC is controlled by executing the fault prediction program & overall control program 5_FP.

The processor core 5 executes a fault prediction program 5_FPP, whereby the processor 4 serves as a fault prediction device configured to predict a fault of the motor 2 coupled via the motor driver 3.

FIG. 4 illustrates the example in which the processor core 5 executes the fault prediction program 5_FPP to serve as the fault prediction device. However, it is not limited to this. Namely, the function realized by the fault prediction program 5_FPP may be realized by hardware such as a logic circuit.

<Deterioration of Motor>

Figure 5:
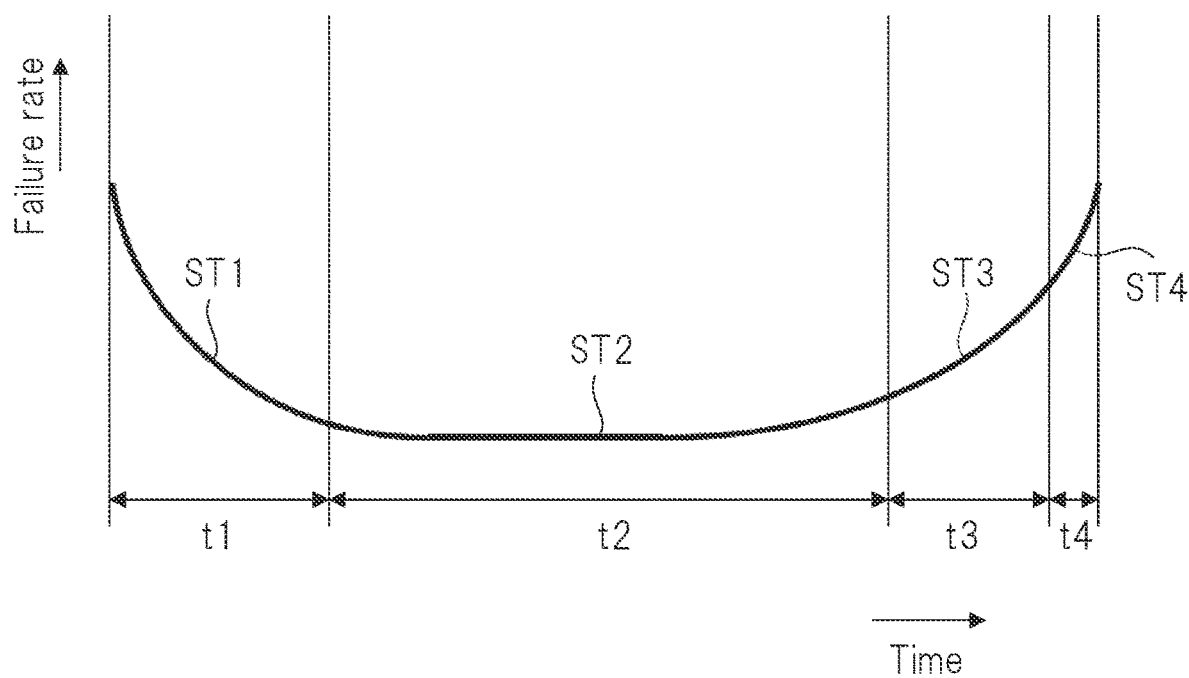
FIG. 5 is a view illustrating a Bathtub curve of a motor according to the embodiment.

A state of the motor 2, which is the target device, deteriorates with the elapse of time. FIG. 5 is a view illustrating a Bathtub curve of the motor 2 according to the embodiment. In FIG. 5, a horizontal axis represents a time and a vertical axis represents a failure rate of the motor 2. As illustrated in FIG. 5, the failure rate at which the motor 2 fails varies as an initial fault period, an accidental fault period, and a wear fault period. Namely, with the elapse of time, a deterioration state of the motor 2 transitions as illustrated in FIG. 5.

The fault prediction device according to the embodiment is provided with a plurality of autoencoders corresponding to the deterioration states of the motor 2 expressed by the Bathtub curve. Although it is not limited particularly, in the embodiment, the Bathtub curve is divided into four time domains t1 to t4. Here, the time domain t1 is an initial period in which the motor 2 is installed, and the time domain t2 is a domain following the time domain t1 and is a domain in which an accidental fault occurs. Further, the time domain t3 is a domain following the time domain t2, and is a domain in which wear has begun to proceed. Further, the time domain t4 is a domain following the time domain t3, and is a domain in which a fault is likely to occur due to wear. In the embodiment, the time domain t1 corresponds to a deterioration state ST1, the time domain t2 corresponds to a deterioration state ST2, the time domain t3 corresponds to a deterioration state ST3, and the time domain t4 corresponds to a deterioration state ST4.

The fault prediction device according to the embodiment includes four autoencoders respectively corresponding to these four deterioration states ST1 to ST4. In the embodiment, when the processor core 5 executes the fault prediction program 5_FPP, the four autoencoders are realized in the processor 4. Of course, the four autoencoders may be realized by hardware.

<Autoencoder>

Weight data and a bias value obtained by learning (training) are set in each of the four autoencoders realized in the processor 4. By setting the weight data and the like, the four autoencoders determine whether the motor 2 exists in the corresponding deterioration state on the basis of the state signal from the motor 2.

<<Learning>>

Figure 6:
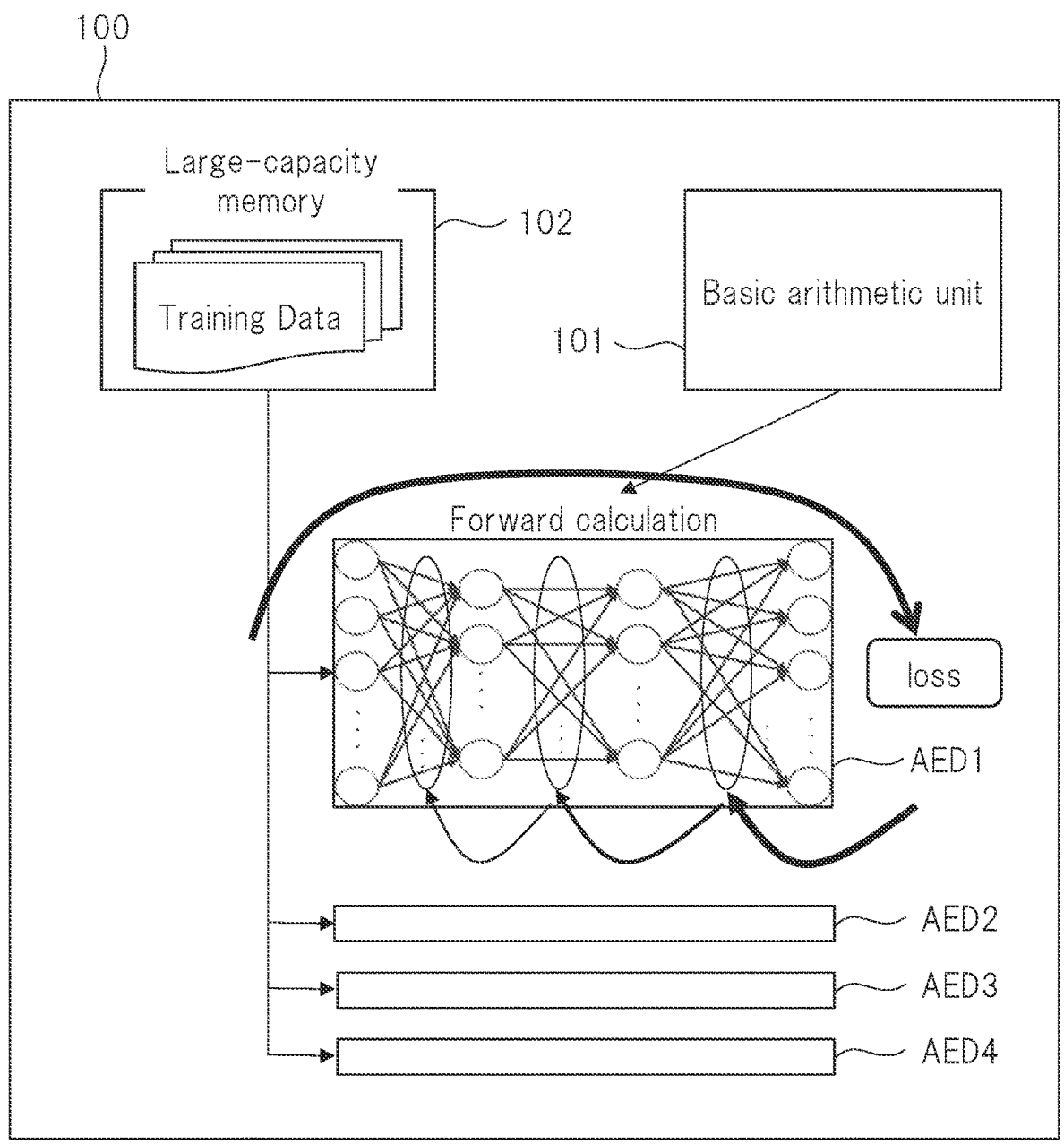
FIG. 6 is a view for explaining learning of autoencoders according to the embodiment.

First, the learning of the autoencoders will be described with reference to the drawings. FIG. 6 is a view for explaining learning of the autoencoders according to the embodiment.

The learning is executed by a server or a computer rather than the processor illustrated in FIG. 4. In FIG. 6, a reference numeral 100 denotes a server for executing the learning. The server 100 includes a basic arithmetic unit 101 and a large-capacity memory 102. By executing a predetermined program on the server 100, four autoencoders AED1 to AED4 using the basic arithmetic unit 101 are configured. Here, it will be described by assuming that the autoencoder AED1 corresponds to the deterioration state ST1 illustrated in FIG. 5, the autoencoder AED2 corresponds to the deterioration state ST2, the autoencoder AED3 corresponds to the deterioration state ST3, and the autoencoder AED4 corresponds to the deterioration state ST4. Further, since the configurations of the autoencoders AED1 to AED4 are similar to each other, the autoencoder AED1 will be described as an example.

A plurality of training data (learning data) used for learning is stored in the large-capacity memory 102, and the training data are supplied to the autoencoder AED1. The autoencoder AED1 calculates and outputs the supplied training data on the basis of the weight data and the bias value. The server 100 updates the weight data and the bias value so that a loss, which is a difference between the supplied training data and an output of the autoencoder AED1, becomes small. The server 100 outputs the weight data and the bias value when the loss becomes small as the weight data and the bias value obtained by learning.

Although the autoencoder AED1 has been described as an example, the server 100 outputs the learned weight data and the learned bias value in the same manner for the autoencoders AED2 to AED4. However, since the autoencoders AED1 to AED4 respectively correspond to the different deterioration states, training data according to the corresponding deterioration state are supplied. Namely, the training data differ depending on the autoencoders AED1 to AED4.

<<Loss of Autoencoder>>

Figure 7:
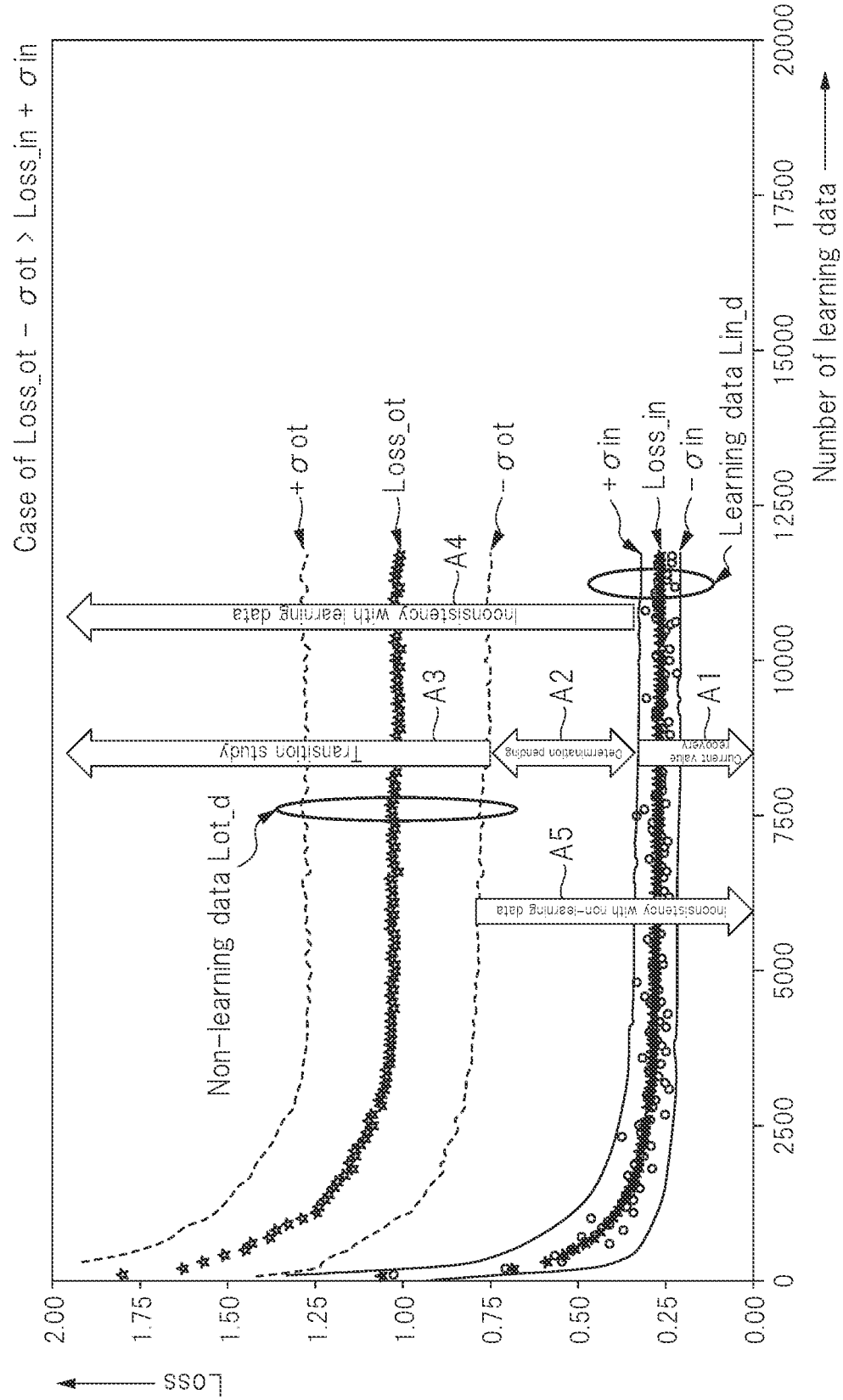
FIG. 7 is a view for explaining the autoencoders according to the embodiment.
Figure 8:
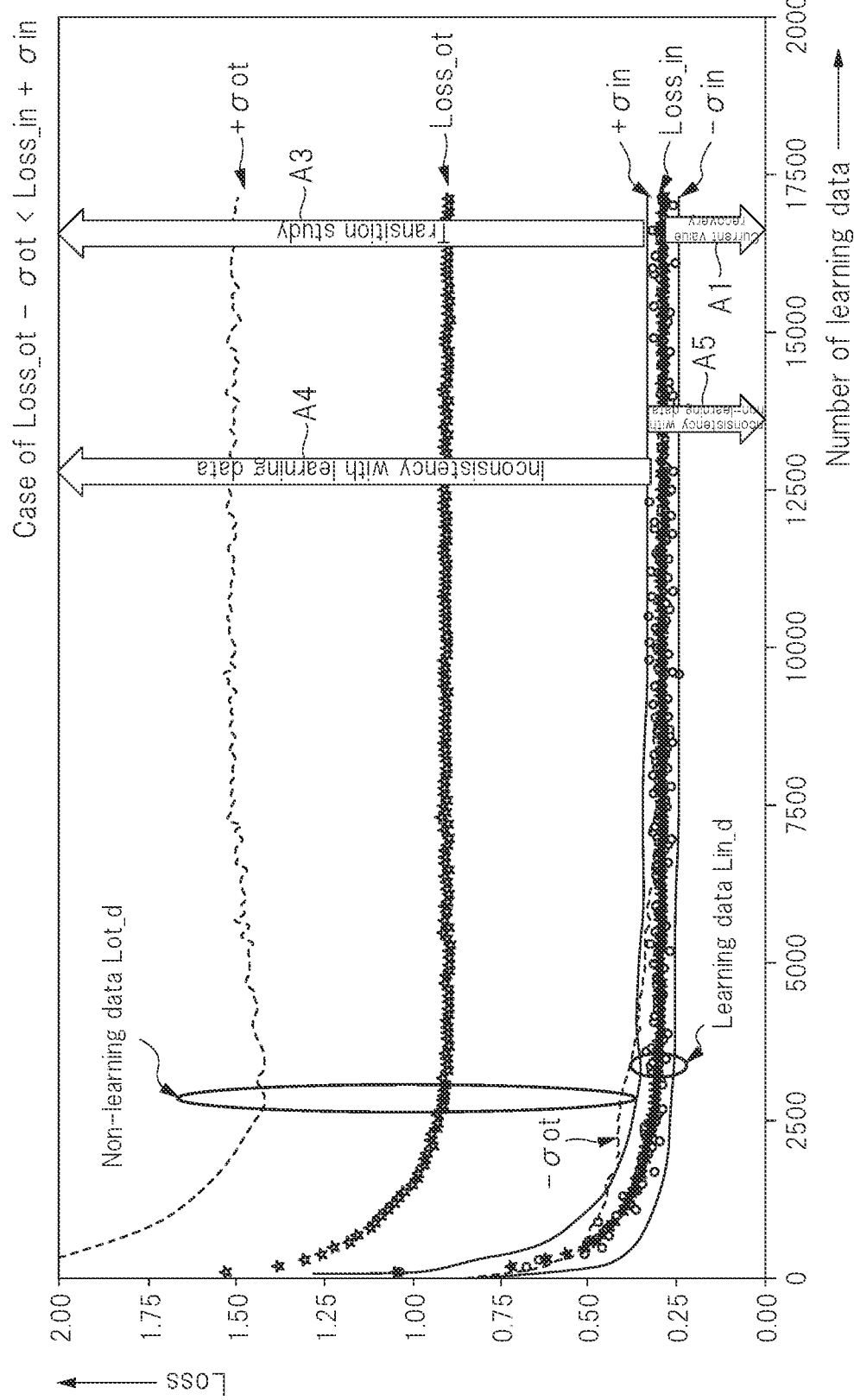
FIG. 8 is a view for explaining the autoencoders according to the embodiment.

FIG. 7 and FIG. 8 are views for explaining the autoencoders according to the embodiment. In FIG. 7 and FIG. 8, horizontal axes represent the number of training data, and vertical axes represent the loss. FIG. 7 and FIG. 8 illustrate a loss when training data (learning data) Lin_d used in learning are supplied to the autoencoder AED2 in which the weight data and the bias value obtained by the learning are set, and a loss when data that are not used in learning, that is, data outside learning (non-learning data) Lot_d are supplied.

FIG. 7 and FIG. 8 illustrate an average of a loss of the autoencoder AED2 when the learning data Lin_d is supplied as Loss_in. Further, variance values at this time are indicated by +σin and -σin. On the other hand, FIG. 7 and FIG. 8 illustrate an average of a loss of the autoencoder AED2 when the non-learning data Lot_d is supplied as Loss_ot. Further, variance values at this time are indicated by +σot and -σot.

For the autoencoders AED1, AED3, and AED4, an average value of a loss and variance values are obtained on the basis of learning data and non-learning data in the similar manner to that of the autoencoder AED2. The average value of the loss and the variance values of each of the autoencoders AED1 to AED4, which are obtained during the learning described above, are stored in the processor core 5 illustrated in FIG. 4. The average value of the loss and the variance values thus stored are used as threshold values in fault prediction, as will be described later.

Further, the average value of the loss and the variance values, which are obtained during the learning, can also be used to determine whether the autoencoders AED1 to AED4 are available or not at the learning stage. Namely, it is possible to use the average value of the loss and the variance values thus obtained as a reference for determining the quality of the autoencoders AED1 to AED4.

Namely, it is desirable that the autoencoder basically satisfies Formula (1).

$$\text{loss Loss\_}ot - \alpha \cdot (\text{variance value}) \sigma ot > \text{loss Loss\_in} \quad (1)$$

Here, α indicates a predetermined coefficient. If Formula (1) is satisfied, the autoencoder can be used to determine 50% or more of the supplied data.

On the other hand, for example, in a case where a condition as in Formula (2) is satisfied, the autoencoder cannot determine the data to be supplied.

$$\text{loss Loss\_}ot - \alpha \cdot (\text{variance value}) \sigma ot < \text{loss Loss\_in} - \alpha \cdot (\text{variance value}) \sigma in \quad (2)$$

In a case where Formula (2) is satisfied, it is necessary to execute preprocessing for generating data to be supplied to the autoencoder or reconstruct a structure of the autoencoder.

Moreover, it can also be used to determine whether the data to be supplied to the autoencoder is abnormal or not. Namely, when data specified as learned is supplied to the autoencoder and a loss of the autoencoder deviated from a determination standard (variance value σ) or a determination standard (α·(variance value)σ), the supplied data are likely to be abnormal data, and are means for confirming whether the supplied data are abnormal or not. Further, in a case where it is confirmed that the supplied data is not abnormal, it is possible to prompt execution of the preprocessing or reconstruction of the structure of the autoencoder.

FIG. 7 illustrates a case where a difference between the loss Loss_ot of the autoencoder AED2 when non-learning data are supplied and the variance value σot (±σot) is larger than a sum of the loss Loss_in of the autoencoder when learning data are supplied and the variance value σin (±σin). On the other hand, FIG. 8 illustrates a case where a difference between the loss Loss_ot of the autoencoder AED2 when non-learning data are supplied and the variance value σot (±σot) is smaller than a sum of the loss Loss_in of the autoencoder when learning data are supplied and the variance value σin (±σin).

<<Inference>>

FIG. 1 is a view for explaining inference by the fault prediction device according to the embodiment. In FIG. 1, a reference numeral 8 denotes a memory with small capacity (small-capacity memory) provided in the processor 4, and a reference numeral 9 denotes an input/output port provided in the processor 4. Further, a reference numeral 5_1 denotes a basic arithmetic unit provided in a microcomputer core 5 (FIG. 4).

By executing the fault prediction program 5_FPP described with reference to FIG. 4, the autoencoders AED1 to AED4 are realized by using the basic arithmetic unit 5_1. The learned weight data and the learned bias value described with reference to FIG. 6 are set to the autoencoders AED1 to AED4.

As described with reference to FIG. 4, a state signal of the motor 2, which is converted from the A/D conversion input port 7 into a digital signal is outputted. This state signal is stored in a small-capacity memory 8. The stored state signal is read out, preprocessing is executed, and the state signal is stored in the small-capacity memory 8 again. Since one example of this preprocessing will be described later, the description thereof will be omitted here.

The preprocessed state signal is supplied to the autoencoders AED1 to AED4. Each of the autoencoders AED1 to AED4 is set by the learned weight data and the learned bias value, and inference 5_IP is executed on the basis of the state signal. The processor core 5 executes a determination program 5_JP for a result of the inference 5_IP, whereby a deterioration state of the motor 2 is obtained and displayed as a result outside the processor 4 via the input/output port 9 (a reference numeral 10). Note that in the embodiment, the determination program 5_JP is a part of the fault prediction program 5_FPP. However, it is not limited to this. Note that the de may be regarded as termination program 5_JP may be regarded as a calculation unit that executes state calculation, which will be described later.

As described above, the autoencoder AED1 corresponds to the deterioration state ST1 illustrated in FIG. 5, the autoencoder AED2 corresponds to the deterioration state ST2, the autoencoder AED3 corresponds to the deterioration state ST3, and the autoencoder AED4 corresponds to the deterioration state ST4. For that reason, on the basis of the state signal, the autoencoder AED1 determines whether the motor 2 exists in the deterioration state ST1 or not, and the autoencoder AED2 determines whether the motor 2 exists in the deterioration state ST2 or not. Similarly, on the basis of the state signal, the autoencoder AED3 determines whether the motor 2 exists in the deterioration state ST3 or not, and the autoencoder AED4 determines whether the motor 2 exists in the deterioration state ST4 or not.

<<<Threshold Value for Determining Existing Deterioration State>>>

In the fault prediction device according to the embodiment, a variance value +σin (FIG. 7 and FIG. 8) obtained by learning is set as a threshold value of current state recovery (current value recovery) A1 of the autoencoder AED2. When loss of the autoencoder AED2 is in a region of the current value recovery A1 as illustrated in FIG. 7, the motor 2 exists in the deterioration state ST2 corresponding to the autoencoder AED2.

On the other hand, in a case where the loss of the autoencoder AED2 exceeds the variance value +σin, the motor 2 may deteriorate or recover to transition to the deterioration state ST3 or ST1. For that reason, it is possible to use a region exceeding the variance value +σin as a transition study region for studying transition of the deterioration states. However, for example, in case of distribution of the loss as illustrated in FIG. 8, the transition study region and the region of the current value recovery A1 are close to each other, and there is a possibility of erroneous determination. For that reason, as illustrated in FIG. 7, a region of determination pending A2 serving as a buffer zone is provided between the region of the current value recovery A1 and a region of transition study A3. In the example of FIG. 7, a region between the variance value +σin and the variance value −σot is defined as the region of the determination pending A2, but the region is not limited to this. In the embodiment, in a case where the loss of the autoencoder AED2 exists in the region of the determination pending A2, the process of determining the deterioration state is not executed.

Note that in FIG. 7 and FIG. 8, A4 denotes a region inconsistency with the learning data, and A5 denotes a region inconsistency with the non-learning data.

<Operation of Fault Prediction Device>

Figure 2:
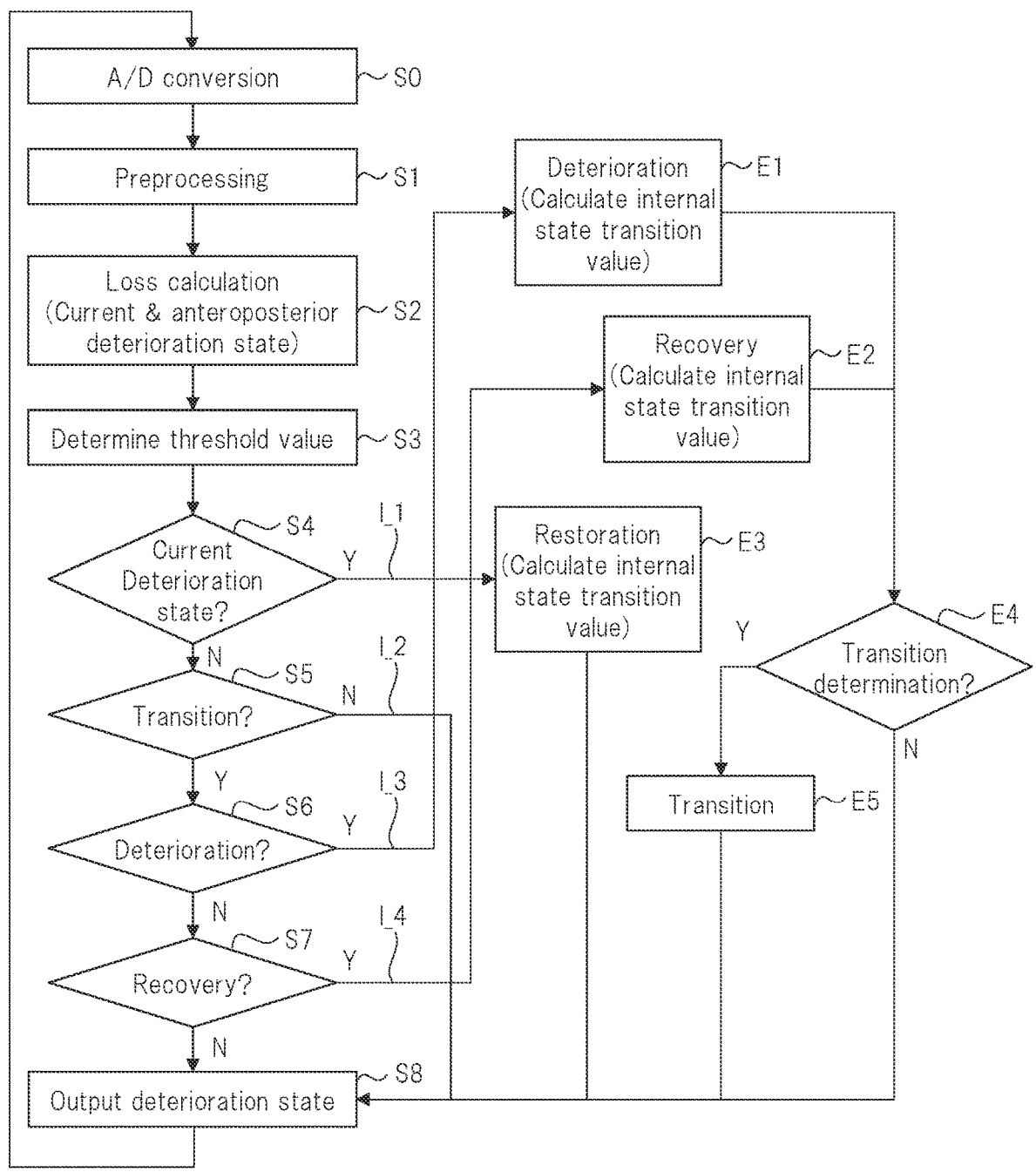
FIG. 2 is a flowchart illustrating an operation of the fault prediction device according to the embodiment.

Next, an operation of the fault prediction device will be described with reference to the drawing. FIG. 2 is a flowchart illustrating an operation of the fault prediction device according to the embodiment.

Although it is not limited particularly, Steps S1 to S8 and Steps E1 to E5 illustrated in FIG. 2 are realized by the processor core 5 illustrated in FIG. 4 executing the fault prediction program 5_FPP including the determination program 5_JP.

Although it is not limited particularly, in the fault prediction program 5_FPP, a deterioration state of the motor 2 (FIG. 4), which is a target device, is expressed by a real number (deterioration real number). Before explaining each of the steps, the deterioration real number expressing the deterioration state will be explained.

The deterioration real number is composed of an integer (deterioration integer) indicating the deterioration states ST1 to ST4 illustrated in FIG. 5 and a decimal number (deterioration decimal number) indicating a transition value of the deterioration state (internal deterioration state transition value). Namely, the deterioration state of the motor 2 is expressed by a combination of a value of this deterioration integer and a value of the deterioration decimal number. The deterioration integer is any of integers 1 to 4 corresponding to the deterioration states ST1 to ST4, and the deterioration decimal number is a value between 0.0 to 0.9, for example.

For example, in a case where the motor 2 exists in the deterioration state ST2, the deterioration state is expressed by any value between the deterioration real numbers 2.0 to 2.9. For example, in a case where an internal state transition value is increased from 0.9 by 0.1, the deterioration integer indicating the deterioration state is increased by 1. When the internal state transition value increases by 0.1 and the deterioration real number changes from 2.9 to 3.0, the deterioration state of the motor 2 transitions from the deterioration state ST2 corresponding to the deterioration real number of 2.9 to the deterioration state ST3 corresponding to the deterioration real number of 3.0, and the deterioration has progressed. Similarly, in a case where the internal state transition value decreases by 0.1, for example, and the deterioration real number expressing the deterioration state changes from 2.0 to 1.9, the deterioration state of the motor 2 transitions from the deterioration state ST2 to the deterioration state ST1, and it means that the deterioration state has recovered. Of course, the method of expressing the deterioration state of the target device is not limited to this. For example, the deterioration decimal number may have a larger number of digits.

Returning to FIG. 2, the respective Steps will be described. First, at Step S0, a state signal of the motor 2 is A/D converted by the A/D conversion input port 7, and is supplied to the processor core 5. At Step S1, the processor core 5 executes preprocessing on the supplied state signal. As this preprocessing, the processor core 5 executes Fast Fourier Transform (FFT) on the state signal which is a digital signal, and extracts a region including information on the deterioration state. The extracted information on the deterioration state is supplied to the autoencoders AED1 to AED4 realized by the processor core 5 as the state signal.

At Step S2, the autoencoder corresponding to a current deterioration state and the autoencoder corresponding to temporally anteroposterior deterioration state execute inference on the basis of the state signal. For the sake of simplicity, it is assumed here that the current deterioration state of the motor 2 is in the deterioration state ST2. As illustrated in FIG. 5, the deterioration state temporally before the deterioration state ST2 is ST1, and the deterioration state temporally after the deterioration state ST2 is ST3. For that reason, at Step S3, the autoencoders AED1 to AED3 execute the inference on the basis of the state signal. In this inference, the autoencoders AED1 to AED3 calculate a loss that is a difference between an input and an output.

At Step S3, the processor core 5 determines the loss of the autoencoders AED1 to AED3 calculated at Step S2 by using an average value of the loss of the autoencoders AED1 to AED3 and a variance value obtained by learning and stored in advance as threshold values. The branching by this determination is illustrated as Steps S4 to S7.

First, at Step S4, it is determined whether the deterioration state of the motor 2 is the current deterioration state ST2 or not. Namely, determination of whether the loss of the autoencoder AED2 corresponding to the deterioration state ST2 calculated at Step S2 exists in a region of the variance value +σin of the autoencoder AED2 stored in advance or less (the current value recovery A1 of FIG. 7) is executed at Step S4. In a case where it is determined that the loss calculated at Step S4 exists in the region of the current value recovery A1 (Y: reference numeral I_1), the processor core 5 executes a process at Step E3. In a case where it is determined that the loss does not exist in the region of the current value recovery A1 (N), the processor core 5 executes a process at Step S5.

At Step E3, the processor core 5 executes restoration of the deterioration state. Namely, at Step E3, the internal state transition value is pulled back to change the deterioration real number expressing the current deterioration state ST2. For example, if a current deterioration real number expressing the deterioration state ST2 is a value indicating a deterioration direction, for example, 2.9, a weight value (for example, 0.1) in a predetermined deterioration direction is subtracted from the deterioration decimal number of 0.9 expressing the internal state transition value. On the other hand, for example, if the current deterioration real number expressing the deterioration state ST2 is a value indicating a recovery direction, for example, 2.0, a weight value in a deterioration direction is added to a deterioration decimal number of 0.0 expressing the internal state transition value. By executing the process at Step E3, the deterioration real number expressing the deterioration state is pulled back toward a central value of the deterioration real number of 2.0 expressing the deterioration state ST2. Note that the calculation at Step E3 is restricted so that the deterioration integer expressing the deterioration state does not change due to the pullback performed at Step E3. Namely, the deterioration integer of 2 expressing the current deterioration state ST2 does not change into the deterioration integers corresponding to the deterioration states ST1 and ST3 even when the process at Step E3 is executed. After Step E3, a process at Step S8 is executed.

In a case where it is determined at Step S4 that the motor 2 does not exist in the current deterioration state ST2, it is determined at Step S5 whether the deterioration state of the motor 2 transitions or not. Namely, it is determined at Step S5 whether the loss obtained at Step S2 exists in the region of the determination pending A2 illustrated in FIG. 7 or not. When the loss exists in the region of the determination pending A2, it is determined at Step S5 that the deterioration state of the motor 2 does not transition (N: reference numeral I_2). When it is determined that the deterioration state of the motor 2 does not transition, the processes at Steps E1 to E5 for processing the internal state transition value are not executed, and the process at Step S8 is executed next. In this case, the deterioration real number expressing the deterioration state does not change, and the current value is maintained.

When it is determined at Step S5 that the transition is appropriate, a process at Step S6 is executed next. At Step S6, the deterioration state is determined using the autoencoder AED3 corresponding to the state of the deterioration direction (the deterioration state ST3). Namely, loss of the autoencoder AED3 calculated at Step S2 is determined at Step S6 by using an average value and a variance value of the loss during learning of the autoencoder AED3 stored in advance as a threshold value. Here, in a case where the loss calculated at Step S2 exists in a region of the variance value +σin or less during the learning of the autoencoder AED3 (the region of the current value recovery A1 of the autoencoder AED3) it is determined that the deterioration is appropriate (Y: reference numeral I_3), and the process at Step E1 is executed next. On the other hand, in a case where the loss calculated at Step S2 does not exist in the region of the variance value +σin or less during the learning of the autoencoder AED3, it is determined at Step S6 that the deterioration is not appropriate (N), a process at Step S7 is executed next.

At Step E1, in the deterioration real number, a predetermined weight value of the deterioration direction is added to the deterioration decimal number that is the internal state transition value. After the predetermined weight value is added at Step E1, a process at Step E4 is executed. For example, if the deterioration real number expressing the deterioration state is 2.9, by adding the predetermined weight value (0.1) of the deterioration direction at Step E1, the deterioration real number expressing the deterioration state changes into 3.0, and the deterioration integer indicating the deterioration state changes. On the other hand, for example, if the deterioration real number expressing the deterioration state is 2.0, by adding the weight value (0.1) of the deterioration direction at Step E1, the deterioration real number expressing the deterioration state merely changes into 2.1, and the deterioration integer is maintained to be 2.

At Step E4, it is determined whether the deterioration state transitions or not on the basis of the current deterioration integer and the deterioration integer obtained at Step E1. Namely, at Step E4, a difference between the deterioration integer calculated at Step E1 and the current deterioration integer is calculated, and it is determined whether transition in the deterioration direction occurs or not on the basis of whether the difference is generated or not. Here, for example, in a case where the difference in a plus direction is generated, it is determined that the deterioration state transitions in the deterioration direction (Y). In a case where the difference is generated, it is determined that the deterioration state does not transition (N). In a case where it is determined that the deterioration state does not transition, the process at Step S8 is executed next. In a case where it is determined that the deterioration state transitions, a process at Step E5 is executed next.

At Step E5, the transition of the deterioration state is confirmed, and the deterioration real number obtained at Step E1 is set as a new deterioration real number. In a case where it is determined at Step E4 that the deterioration state does not transition or the process at Step E5 is executed, the process at Step S8 is executed next.

In a case where it is determined at Step S6 that the deterioration is not appropriate, it is determined at Step S7 whether the deterioration state of the motor 2 is recovered or not. At Step S7, the deterioration state is determined by using the autoencoder AED1 corresponding to the deterioration state ST1 in the recovery direction. Namely, at Step S7, the loss of the autoencoder AED1 calculated at Step S2 is determined by using the average value and the variance value of the loss during the learning of the autoencoder AED1 stored in advance as the threshold values. Here, in a case where the loss calculated at Step S2 exists in the region of the variance value +σin or less during the learning of the autoencoder AED1 (the region of the current value recovery A1 of the autoencoder AED1), it is determined that recovery is appropriate (Y: reference numeral I_4), and a process at Step E2 is executed next.

On the other hand, in a case where the loss of the autoencoder AED1 calculated at Step S2 does not exist in the region of the current value recovery A1 during the learning of the autoencoder AED1, it is determined at Step S7 that the recovery is not appropriate (N). In this case, the processes at Steps E1 to E5 for processing the internal state transition value are not executed, and the process at Step S8 is executed next. Namely, similar to when it is determined at Step S5 that the deterioration state of the motor 2 does not transition, determination is pending, the deterioration real number is not updated, and the current value is maintained.

At Step E2, an operation is executed in which the weight value in the predetermined recovery direction is subtracted from the deterioration decimal number corresponding to the internal state transition value. As can be seen from the Bathtub curve illustrated in FIG. 5, the target device is basically deteriorated with elapse of time. It is rare that the state is recovered in spite of elapse of time. For that reason, the weight value in the recovery direction is set to a value different from the weight value in the deterioration direction. The weight value in the recovery direction is set to 0.05, for example. This makes it possible to reduce the influence of erroneous determination of a determination result of the AI, which is determination of a stochastic event.

For the deterioration real number calculated at Step E2, it is determined at Step E4 whether the deterioration state transitions or not by the similar method as described above. If the deterioration integer is subtracted by one in the calculation at Step E2, a difference in a minus direction between the current deterioration integer and the deterioration integer calculated at Step E2 is generated. In this case, the process at Step E5 is executed after Step E4, the deterioration real number calculated at Step E2 is set as a new deterioration real number at Step E5. On the other hand, if no difference is generated, the process at Step S8 is executed next.

At Step S8, the deterioration state corresponding to the deterioration real number supplied from Steps S5, S7, and E3 to E5 is outputted as result display 10 illustrated in FIG. 1, for example. After Step S8, the processing flow returns to Step S0, and Steps described above are repeated. In this case, if a new deterioration real number is set at Step E5, a deterioration state expressed by the new deterioration real number is used as the current deterioration state when the processes after Step S2 are to be executed. As a result, the deterioration state changing with elapse of time is displayed as the result display 10.

For example, when the deterioration state ST4 is displayed as the result display 10, the probability that fault of the motor 2 will occur is high. Therefore, it is possible to predict the fault.

In the fault prediction device according to the embodiment, in a case where the determination is difficult as Step S5, the determination based on the supplied state signal is discarded, the current state is maintained, and the deterioration state is obtained on the basis of a determination result when a state signal by which the determination is possible is supplied. This makes it possible to reduce the influence of erroneous determination. In particular, in determining a fault event having a relatively long time constant such as the motor 2, there are few problems even if a current defect state is maintained in this manner. In the embodiment, the transition of the defect state is determined by a serial majority decision by the autoencoder corresponding to the current defect state and the two autoencoders corresponding to the defect states before and after the autoencoder. For example, even though the autoencoder corresponding to the current defect state determines that the transition of the defect state is appropriate on the basis of the threshold value (variance value) during the learning, the transition of the defect state is not determined and the current defect state is maintained unless any of the two autoencoders corresponding to the defect states before and after the autoencoder determines that the transition of the defect state is appropriate.

Further, in the embodiment, by combining the AI determination up to three times and the state calculation without using AI for one state signal, the fluctuation of the AI determination, which is a stochastic event, can be absorbed, and it becomes possible to output the accurate deterioration state from the state signal. Here, as described in FIG. 2, the AI determination up to three times corresponds to Step S2 executed by the autoencoders AED2, AED3, and AED1. Further, the state calculation corresponds to Steps S3 to S7 and E1 to E5 for executing determination and calculation on the basis of the loss calculated by the autoencoders AED1 to AED3. This state calculation is realized by the processor core 5 executing the determination program 5_JP illustrated in FIG. 1. However, the state calculation is not limited to this, and may be realized by hardware such as a logic circuit.

In the above description, the case where the current deterioration state is ST2 has been described as an example. However, the same applies to any of the cases where the current deterioration state is ST1, ST3, and ST4. However, in a case where the current deterioration state is ST1, the previous deterioration state does not exist. In a case where the current deterioration state is ST4, the later deterioration state does not exist. Although it is not limited particularly, if there is no deterioration state, the corresponding Steps are omitted in FIG. 2.

<Example of Deterioration State Transition>

Figure 3:
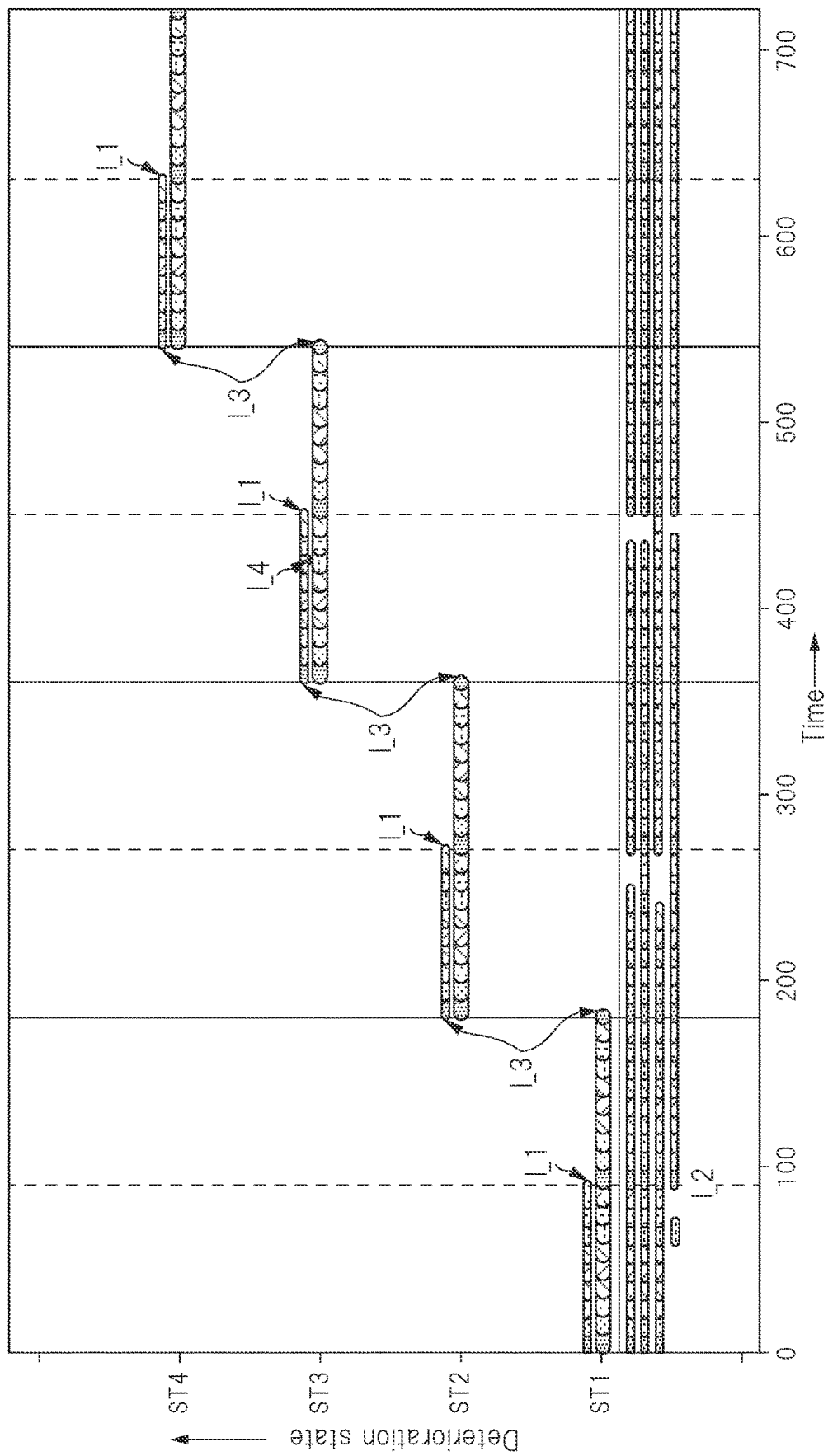
FIG. 3 is a view for explaining an operation of the fault prediction device according to the embodiment.

FIG. 3 is a view for explaining an operation of the fault prediction device according to the embodiment. In FIG. 3, a horizontal axis represents a time and a vertical axis represents the deterioration states ST1 to ST4. In FIG. 3, reference numerals I_1 to I_4 respectively correspond to the reference numerals I_1 to I_4 illustrated in FIG. 2.

With elapse of time, deterioration of the motor 2 progresses, and the deterioration state transitions from the deterioration state ST1 toward the deterioration state ST4. A deterioration real number (1.0) representing the deterioration state ST1 increases by (0.1) each time a state I_3 indicating deterioration occurs. When the deterioration real number reaches 2.0, the deterioration state transitions to the deterioration state ST2. After that, in the similar manner, the deterioration real number increases, and the deterioration state transitions in a deterioration direction from the deterioration state ST2 to the deterioration state ST4. If a recovery state I_1 occurs on the way, the deterioration real number is pulled back. Further, as illustrated in the deterioration state ST4, when a restoration state I_4 occurs on the way, the deterioration real number is subtracted. Even though a determination pending state I_2 occurs, the deterioration real number is maintained. Thus, it is not reflected to the transition of the deterioration state.

In the embodiment, even in a case where it is determined that the transition is appropriate in a current deterioration state, only the transition to the deterioration state before and after the current deterioration state is possible. For that reason, even though an abnormality occurs in a state signal from a target device due to a temporary surge, for example, only the transition to deterioration state before and after the current deterioration state occurs, and it is possible to prevent the transition to the deteriorated state far away from the current deterioration state.

The fault prediction device according to the embodiment includes a plurality of autoencoders (AED1 to AED4), which are compact AI. The plurality of autoencoders AED1 to AED4 respectively correspond to the deterioration states ST1 to ST4 of the target device. Data and the like are set with weights so as to match a corresponding deterioration state during learning, and information regarding loss obtained during the learning is set as a threshold value at the time of fault prediction. This makes it possible to set the threshold value of the autoencoder, which is a problem when using the autoencoder at the time of the fault prediction, to a value that captures the characteristics of the learning data, and it becomes possible to eliminate the sensory setting of the threshold value. Further, in the fault prediction device according to the embodiment, the transition of the deterioration state is obtained by the state calculation on the basis of the results of inference by the autoencoders respectively corresponding to the deterioration states. For that reason, it is possible to predict fault without using a huge amount of past information as in the LSTM technology. As a result, it is possible to realize the fault prediction device by using a processor core or a processor having a small memory size.

Further, since the plurality of autoencoders used for inference is compact, each learning converges at high speed. For that reason, it is possible to shorten the learning time. Moreover, for example, in a case where accuracy of fault prediction is low, instead of reconstructing all the autoencoders, the autoencoders that contribute to the improvement of accuracy may be identified from all the autoencoders, and only the identified autoencoders may be reconstructed. Alternatively, a specific valid autoencoder may be obtained and replaced. This makes it possible to shorten the development period of the fault prediction device.

Further, in the fault prediction device according to the embodiment, the fault prediction is executed not by an inference result itself by the autoencoder, but by the state calculation based on the inference result. Here, the inference by the autoencoder is regarded as a preprocessing unit, and the state calculation is regarded as a postprocessing unit. In a case where a problem occurs in the fault prediction device, the preprocessing unit and the postprocessing unit can be separated to specify a cause part of occurrence of the problem, and the problem can be solved by improving only the cause part. For that reason, it is possible to eliminate the need for reconstruction or re-learning of the entire fault prediction device, and it is possible to shorten the countermeasure time when a problem occurs.

Further, since a determination result in the middle can be easily extracted from the postprocessing unit, it becomes possible to confirm the operation easily. Moreover, it is also possible to generate an alert from the postprocessing unit when a state signal with an unknown feature is inputted.

As described above, the invention made by the inventors of the present application has been described specifically on the basis of the embodiment. However, the present invention is not limited to the embodiment described above, and it goes without saying that the present invention may be modified into various forms without departing from the substance thereof.

What is claimed is:

1. A fault prediction device for predicting a fault of a target device whose deterioration state transitions with elapse of time, the fault prediction device comprising:
    a plurality of autoencoders respectively corresponding to deterioration states of the target device, the plurality of autoencoders including i) a first autoencoder trained with state signals associated with a first deterioration state of the target device and ii) a second autoencoder trained with state signals associated with a second deterioration state of the target device, the second deterioration state representing a progressed deterioration state compared to the first deterioration state; and
    a processor configured to:
    acquire a state signal indicating a state of the target device;
    input the state signal into the plurality of autoencoders;
    compute a reconstruction loss for each of the plurality of autoencoders, the reconstruction loss being a difference between the state signal input into the respective autoencoder and an output signal reconstructed by the respective autoencoder;
    compare the reconstruction loss computed by the first autoencoder to a first threshold corresponding to the first deterioration state;
    determine that the target device exists in the first deterioration state based on determining that the reconstruction loss computed by the first autoencoder is within the first threshold;
    compare the reconstruction loss computed by the second autoencoder to a second threshold corresponding to the second deterioration state when the reconstruction loss computed by the first autoencoder exceeds the first threshold; and
    determine that the target device exists in the second deterioration state based on determining that the reconstruction loss computed by the second autoencoder is within the second threshold,
    wherein the plurality of autoencoders are configured to evaluate deterioration states of the target device in a sequential manner such that each of the plurality of autoencoders determines whether the target device exists in a corresponding deterioration state based on variations in reconstruction loss values.

2. The fault prediction device according to claim 1, wherein, in a case where the first autoencoder determines that the target device exists in a determination pending area, the target device is determined that the target device exists in the first deterioration state.

3. The fault prediction device according to claim 2,
    wherein the deterioration states of the target device transitions over time in accordance with a Bathtub curve representing a failure rate of the target device, and
    wherein the plurality of autoencoders are respectively trained with state signals corresponding to different areas of from each other in the Bathtub curve.

4. The fault prediction device according to claim 3,
    wherein the plurality of autoencoders further includes a third autoencoder trained with state signals associated with a third deterioration state,
    wherein the third deterioration state represents a progressed deterioration state compared to the first deterioration state,
    wherein the deterioration state includes the first deterioration state, the second deterioration state, and the third deterioration state, which are expressed by the Bathtub curve,
    wherein, in a case where the second autoencoder determines that the target device does not exist in the second deterioration state, the third autoencoder determines whether the target device exists in the third deterioration state based on the state signal.

5. The fault prediction device according to claim 4,
    wherein the processor is configured to determine a deterioration state, in which the target device exists, based on outputs of the first autoencoder, the second autoencoder, and the third autoencoder.

6. The fault prediction device according to claim 5, wherein the processor is further configured to express a deterioration state of the target device as a deterioration real number comprising includes i) a deterioration integer representing a discrete deterioration state and ii) a deterioration decimal number representing a progression within the deterioration state,
- wherein the processor is configured to update the deterioration decimal number in a case where the second autoencoder determines that the target device exists in the second deterioration state, and
- wherein the processor is configured to update the deterioration integer based on the deterioration decimal number reaching a predetermined threshold, and
- wherein an update of the deterioration decimal integer indicates a transition of the deterioration state of the target device.

7. A fault prediction method of predicting fault of a target device whose deterioration state transitions with elapse of time, the fault prediction method comprising:
- acquiring a state signal indicating a state of the target device;
- inputting the state signal into a plurality of autoencoders respectively corresponding to different deterioration states of the target device, the plurality of autoencoders including i) a first autoencoder trained with state signals associated with a first deterioration state of the target device and ii) a second autoencoder trained with state signals associated with a second deterioration state of the target device, the second deterioration state representing a progressed deterioration state compared to the first deterioration state;
- computing a reconstruction loss for each of the plurality of autoencoders, the reconstruction loss being a difference between the state signal input into the respective autoencoder and an output signal reconstructed by the respective autoencoder;
- comparing the reconstruction loss computed by the first autoencoder to a first threshold corresponding to the first deterioration state;
- determining that the target device exists in the first deterioration state when the reconstruction loss computed by the first autoencoder is within the first threshold;
- comparing the reconstruction loss computed by the second autoencoder to a second threshold corresponding to the second deterioration state when the reconstruction loss computed by the first autoencoder exceeds the first threshold; and
- determining that the target device exists in the second deterioration state when the reconstruction loss computed by the second autoencoder is within the second threshold,
- wherein the plurality of autoencoders are configured to evaluate deterioration states of the target device in a sequential manner, such that each of the plurality of autoencoders determines whether the target device exists in a corresponding deterioration state based on variations in reconstruction loss values.

8. The fault prediction method according to claim 7, further comprising determining whether the reconstruction loss computed by the first autoencoder falls within a determination pending area,
- wherein when the reconstruction loss is within the determination pending area, the target device is determined to exist in the first deterioration state.

9. The fault prediction method according to claim 8,
- wherein the deterioration state that transitions over time is expressed by a Bathtub curve of the target device,
- wherein the Bathtub curve representing a failure rate of the target device, and
- wherein the plurality of autoencoders are respectively trained with state signals corresponding to different areas of the Bathtub curve.

10. The fault prediction method according to claim 9,
- wherein the deterioration state includes the first deterioration state, the second deterioration state, and a third deterioration state, each corresponding to different phases of the Bathtub curve,
- wherein the second deterioration state represents a progressed deterioration state compared to the first deterioration state, and the first deterioration state represents a progressed deterioration state compared to the third deterioration state, and
- wherein the fault prediction method further comprises determining, when the second autoencoder determines that the target device does not exist in the second deterioration state, by a third autoencoder corresponding to the third deterioration state, whether the target device exists in the third deterioration state based on the state.

* * * * *